No. 660,812. Patented Oct. 30, 1900.
G. A. FREER.
POST HOLE DIGGER.
(Application filed Feb. 5, 1900.)
(No Model.)
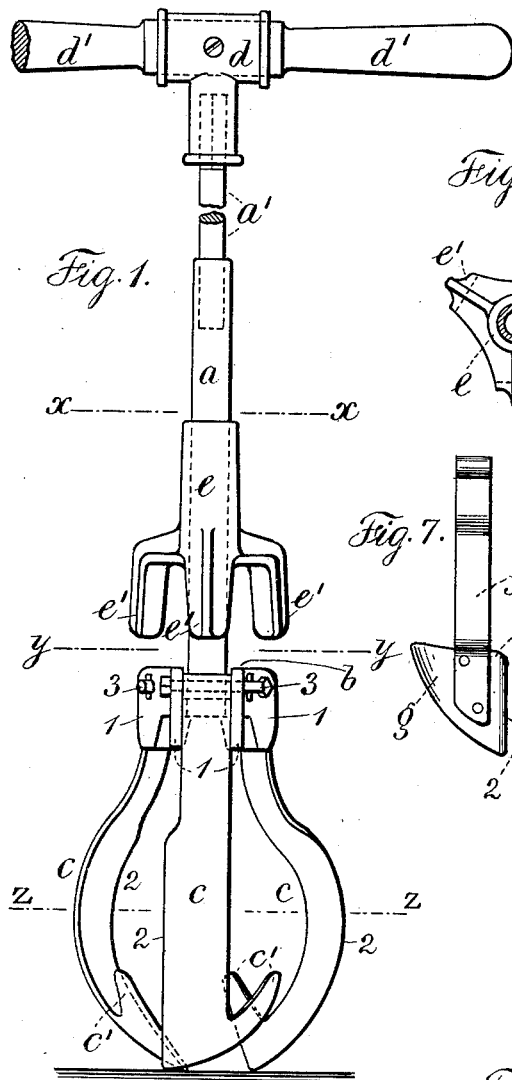
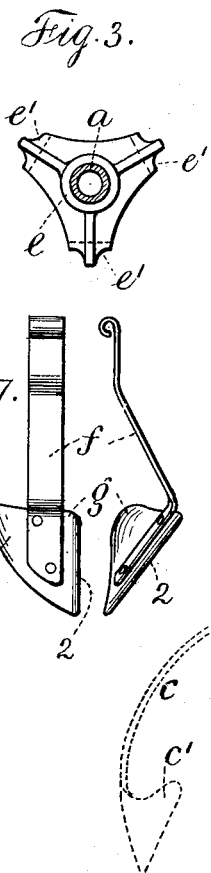
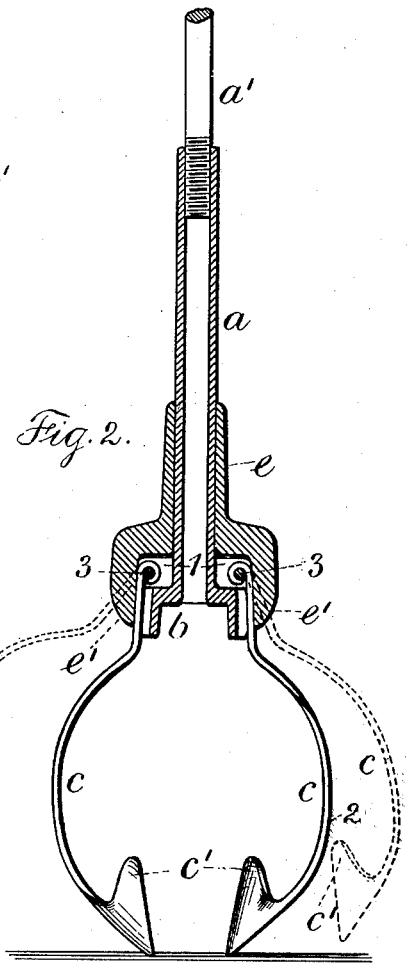
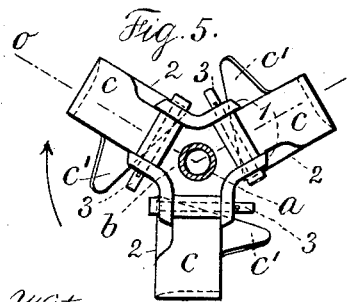
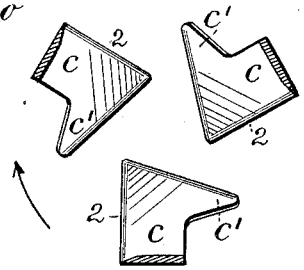
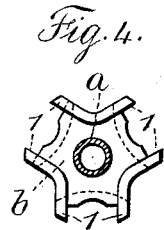
Witnesses:
J. Staib
Chas. H. Smith
Inventor:
Glyndon Abraham Freer
per L. W. Perrell & Son
attys.
THE NORRIS PETERS CO., PHOTO-LITHO., WASHINGTON, D. C.

UNITED STATES PATENT OFFICE.

GLYNDON ABRAHAM FREER, OF JACKSON, MICHIGAN.

POST-HOLE DIGGER.

SPECIFICATION forming part of Letters Patent No. 660,812, dated October 30, 1900.

Application filed February 5, 1900. Serial No. 3,983. (No model.)

*To all whom it may concern:*

Be it known that I, GLYNDON ABRAHAM FREER, a citizen of the United States, residing at Jackson, in the county of Jackson and State of Michigan, have invented an Improvement in Post-Hole Diggers, of which the following is a specification.

My invention relates to a rotary post-hole digger or earth-auger; and the object of my invention is to provide a simple, strong, and efficient device and one from which a quantity of earth, especially in a moist condition, can be quickly discharged.

In carrying out my invention the blades are each bent and provided with a colter. These blades are pivoted at their upper ends to a head-block having pivot-lugs and secured at the lower end of the tubular stem of the digger. The colters are provided with a vertical advancing sharpened edge, and they may be made integral with the blades or separate therefrom and securely fastened thereto. A clutch sliding upon the said tubular stem extends over the upper pivoted ends of the blades to hold them in place. This clutch is to be raised when it is required to discharge the earth from between the blades.

In the drawings, Figure 1 is an elevation and partial section representing my improvement with the clutch raised. Fig. 2 is a partial vertical section at the line $o\ o$, Fig. 5, and elevation of the same with the digging-blades shown in dotted lines in an outward position and the clutch down to lock the blades. Fig. 3 is a section and partial plan at $x\ x$ of Fig. 1. Fig. 4 is a sectional plan of the head-block. Fig. 5 is a sectional plan at $y\ y$ of Fig. 1. Fig. 6 is a sectional plan at $z\ z$ of Fig. 1, and Fig. 7 is an elevation and edge view representing one of the blades and colters of modified form.

The tubular stem $a$ of the digger is provided at its lower end with a head-block $b$, made with pivot-lugs 1, and to the upper end of this tubular stem a removable rod $a'$ is connected, which extends upward to and is connected with a T-head $d$, through which T-head pass the handles $d'$, by which the digger is rotated.

The blades $c$ in Figs. 1 to 6, inclusive, are alike. They are curved approximately as shown and are each provided with integral end colters having a cutting edge 2 on the advancing side of the blades and with a share $c'$ on the other side at the lower end, and the upper end is made with an eye for a pivot-pin 3, by which the blades are connected to the pivot-lugs of the head-block.

The clutch comprises a tubular portion $e$, surrounding the stem $a$, and downward-extending clutch-fingers $e'$, integral with the tubular portion $e$. This clutch is made heavy, so as to retain its position, and the clutch-fingers extend outside of the blades $c$ and fit over the head-block $b$, so that in the operation of the digger the clutch-fingers $e'$ prevent the outward movement of the blades $c$.

In the operation of the device the digger is to be rested upon the ground, as shown in Fig. 1, and rotated in the direction of the arrow. This causes the colters of the blades to cut into the earth and to scoop the same into the center or intervening space, the hole dug being of a width across equal to the diameter of the circle described by the cutting edges of the colters. The cutting edge 2 progressively separates the earth, and the lower edge of the colter is a cutting edge, which, with the cutting edge 2, causes the digger to act as an earth-auger, both edges cutting as the blades are forced down into the ground, and when the space between the blades is full it is advantageous to raise the digger, so as to discharge the confined earth. This is readily done by lifting the clutch, which action permits the blades to swing on their pivots and the earth to be discharged. This is especially necessary and advantageous where the ground is moist, as in that case the earth confined between the blades is liable to be more or less in a solid cake or ball.

In the modification shown in Fig. 7 the blades $f$ are each provided with an eye at the upper end for the pivot-bolt 3, by which they are connected to the head-block $b$. These blades $f$ are bent as shown, and the colters $g$ are connected thereto, preferably, by rivets, the blades $f$ lying against the inner surface of the colters $g$, so that the same present a smooth exterior against the earth in digging the post-hole.

In case it is desirable to dig a hole deeper than the length of the first rod would permit then the T-head is raised off the squared upper end of the rod $a'$, and another rod with a coupling at its lower end is connected, respectively, to the upper end of the rod $a'$ and the T-head. This can be readily done without removing the digger from the hole in the ground.

The blades $c$ are made of suitable tempered metal for the operations demanded.

I claim as my invention—

1. In a digger, the combination with a handle and a stem, of a head-block at the lower end of the stem, blades pivoted at their upper ends to the said head-block, and colters at the lower ends of the blades, and a clutch slidable on the stem above the head and having downwardly-extending spaced-apart fingers adapted to hold the blades and colters normally in position for digging, and which when raised, permit the blades to swing outward to deliver the confined earth, substantially as set forth.

2. The combination in a digger with a handle and stem, of a head-block at the lower end of the stem, blades pivoted at their upper ends in the head-block, colters at their lower ends having a cutting advancing edge and a share, and a sliding clutch device having downward-extending fingers adapted to pass over and normally confine the blades and colters in place, and which when raised release the same to deliver the confined earth, substantially as set forth.

3. The combination in a digger with a handle and tubular stem, of a head-block at the lower end of the stem, curved blades having eyes at their upper ends pivoted in the head-block, and colters integrally formed with said blades at their lower ends, said colters having an advancing cutting edge 2 and under cutting edge and a share $c'$, and a clutch movable longitudinally of the tubular stem and adapted to extend outside of and normally engage the said blades or to release the same, substantially as set forth.

4. The combination in a digger with a handle and stem, of a head-block at the lower end of the stem, curved blades pivoted at their upper ends in the head-block and colters integrally formed with said blades at their lower ends, said colters having an advancing cutting edge 2 and under cutting edge and a share $c'$, and a clutch movable longitudinally of the stem and adapted to extend outside of and normally engage the said blades or to release the same, substantially as set forth.

Signed by me this 17th day of January, 1900.

GLYNDON ABRAHAM FREER.

Witnesses:
W. C. SHANAFELT,
DANIEL H. PERRY.